US005867290A

United States Patent [19]
Dutt et al.

[11] Patent Number: 5,867,290
[45] Date of Patent: Feb. 2, 1999

[54] HIGH CAPACITY SPREAD SPECTRUM OPTICAL COMMUNICATIONS SYSTEM

[75] Inventors: Birendra Dutt; Manouher Naraghi; James Chan, all of Culver City, Calif.

[73] Assignee: RDL Commercial Technologies Corporation, Culver City, Calif.

[21] Appl. No.: 752,211

[22] Filed: Nov. 19, 1996

[51] Int. Cl.⁶ .................................................. H04J 14/00
[52] U.S. Cl. ........................................ 359/115; 359/181
[58] Field of Search ................................... 359/115, 117, 359/130, 135, 123, 136, 137, 181

[56] References Cited

U.S. PATENT DOCUMENTS

| | | | |
|---|---|---|---|
| 3,873,825 | 3/1975 | Jones et al. | |
| 4,449,385 | 5/1984 | Thirion et al. | |
| 4,703,474 | 10/1987 | Foschini et al. | 370/18 |
| 4,901,307 | 2/1990 | Gilhousen et al. | |
| 5,177,768 | 1/1993 | Crespo et al. | 375/1 |
| 5,289,299 | 2/1994 | Paek et al. | |
| 5,351,147 | 9/1994 | Frankel | 359/124 |
| 5,410,147 | 4/1995 | Riza et al. | 250/214 LS |
| 5,438,440 | 8/1995 | Paek et al. | 359/11 |
| 5,519,526 | 5/1996 | Chua et al. | |
| 5,602,833 | 2/1997 | Zehavi | |
| 5,760,941 | 6/1998 | Young et al. | 359/181 |

FOREIGN PATENT DOCUMENTS

| | | |
|---|---|---|
| 0031027 | 11/1980 | European Pat. Off. |
| 9610163 | 4/1996 | WIPO |

OTHER PUBLICATIONS

Nguyen, Lim, Principle and Practice of Optical Code–Division Multiple Access Communication; Dept. of Electricl and Computer Engineering, Rice University, Ph.D. Oral Exam., Oct. 12, 1995.

Salehi, Jawad A., Code Division Multiple–Access Techniques in Optical Fiber Networks—Part I: Fundamental Pricniples; IEEE Transactions on Communications, vol. 37, No. 8, Aug. 1989.

Salehi, Jawad A. and Brackett, Charles A., Code Division Multiple–Access Techniques in Optical Fiber Networks—Part II: Systems Performanc Analysis; IEEE Transactions on Communications, vol. 37, No. 8, Aug. 1989.

Nelson, Laurie B., Performance of Multiuser Detection for Optical CDMA—Part I: Eror Probabilities; IEEE Transactions on Communications, vol. 43, No. 11, Nov. 1995.

Chung, Fan R.K., Salehi, Jawad A., and Wei, Victor K., Optical Orthogonal Codes: Design, Analysis, and Applicaitons; IEEE Transactions on Information Theory, vol. 35, No. 3, May 1989.

Yang, Guu–Chang and Fuja, Thomas E., Optical Orthogonal Codes with Unequal Auto–and Cross–Correlation Constraints; IEEE Transactions on Information Theory, vol. 41, No. 1, Jan. 1995.

Weiner, et al. "Programmable femtosecond pulse shaping by use of a multielement liquid–crystal phase modulator," Optics Letters, 15 (1990) Mar. 15, No. 6, pp. 326–328.

Wefers, Marc M. And Keith A. Nelson. "Programmable phase and amplitude femtosecond pulse shaping," Optics Letters, 18 (1993) Dec. 1, No. 23, pp. 2032–2034.

(List continued on next page.)

*Primary Examiner*—Rafael Bacares
*Attorney, Agent, or Firm*—Loeb & Loeb LLP

[57] ABSTRACT

Methods and apparati for spatially encoding and decoding spread spectrum communication signals using broad band light sources are disclosed. The encoding algorithms involve the use of orthogonal spatial wavelets, which are preferably discrete attenuation functions of light from different sources so that the discrete attenuation function is imposed upon the spectrum of the light source. The function may be used either merely for providing an encoded channel or by providing a second mask that may be, for example, the complement of the discrete attenuation function so that the light beam is discrete with the first attenuation function.

14 Claims, 7 Drawing Sheets

OTHER PUBLICATIONS

Kavehrad, M. And D. Zaccarin, "Optical Code–Division–Multiplexed Systems Based on Spectral Encoding of Noncoherent Sources," Journal of Lightwave Technology, 13 (1995) Mar., No. 3, pp. 534–545.

Hassan, et al. "Spatial Optical CDMA," IEEE Journal, 13 (1995) Apr., No. 3, pp. 609–613.

Decusatis, et al. "Hybride optical implementation of discrete wavelet transforms: a tutorial," Optics and Laser Technology, vol. 28, No. 2, pp. 51–58, 1996.

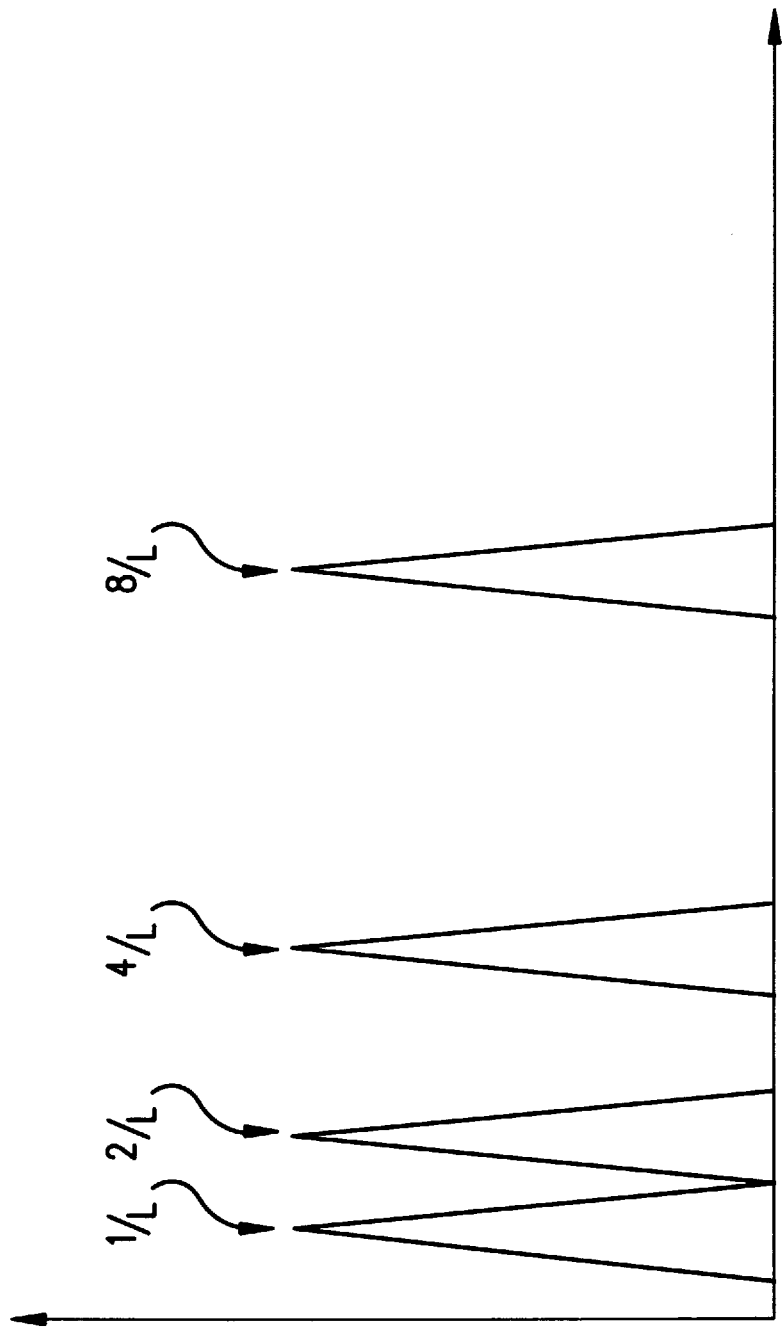

HIGH CAPACITY SPREAD SPECTRUM OPTICAL COMMUNICATIONS SYSTEM

BACKGROUND OF THE INVENTION

1. Area of the Invention

This invention relates to spread spectrum communications systems and more particularly to optical spread spectrum communications systems.

2. Description of the Prior Art

Over the last two decades, optical communications over fiber optics have come increasingly into use for transmission of large quantities of data. Although initially, such fiber systems used narrow bandwidth systems such as those using laser light for communications, attempts have been made to increase system capacities. For example, in prior art systems, wavelength (frequency) division multiplexing has been accomplished by modulating a plurality of lasers at different frequencies and transmitting the modulated light from the various different lasers over the same fiber. Still further, various forms of time domain multiplexing have been done over digital fiber networks.

There have been a few proposals to provide digital optical networks using spread spectrum communications. These are set forth in the following papers and presentations: "Coherent Ultrashort Light Pulse Code-Division Multiple Access Communication Systems", Journal of Lightwave Technology, Vol. 8, No. 3, March 1990; L. Nguyen, B. Aazhang, J. F. Young "Optical CDMA with Spectral Encoding and Bipolar Codes", Proc. 29th Annual Conf. Information Sciences and Systems (Johns Hopkins University, Mar. 22–24, 1995); N. B. Mandayan, B. Aazhang, "An Adaptive Single-user Detector for Optical Code Division Multiple Access Systems," Proc. 28th Annual Conf. Information Sciences and Systems, (Princeton University N.J. Mar. 16–18 1994) M. Brandt-Pearce, B. Aazhang, "Performance of Multiuser Detection for Optical Spectral Amplitude CDMA System", Proc. 27th Annual Conf. Information Sciences and Systems (Johns Hopkins University Mar. 24-26 1993) p. 308–11; N. B. Mandayam, B. Aazhang "Generalized Sensitivity Analysis for Optical Code Division Multiple Access Systems" Proc. (same) p. 302–07; M. Brandt-Pearce, B. Aazhang "Optical Spectral Amplitude Code Division Multiple Access System" Proc. International Symposium on Information Theory, San Antonio Tex. p. 379 Jan. 17–22, 1993; M. Brandt-Pearce et al. "Performance Analysis of Single-user and Multiuser Detectors for Optical Code Division Multiple Access Communications," IEEE Transactions on Communications, Vol. Com-43 No. 3 1995; A. Pasasakellariou et al. "Code Design for Interference Suppression in CDMA Systems with Continuous Phase Modulation" Proc. 29th Annual Conf. Information Sciences and Systems, Johns Hopkins U. Md. 1995; and "High Capacity Optical CDMA Communications Networks presented July 1994 at the assignee of this application; A Semiclassical Analysis of Optical Code Division Multiple Access, D. Brady and S. Verdu, IEEE Transactions on Communications, Vol. 39, No. 1, January 1991, pp. 85–93; W. C. Wong et al. "Synchronous vs. Asynchronous CDMA for Fiber Optic LANS Using Optical Signal Processing", November 1989, pp. 1012–1016; and the following U.S. Pat. No. 5,519,526 to Chan et al.; U.S. Pat. No. 4,703,474 to Foschini et al.; U.S. Pat. No. 5,289,299 to Paek et al.; U.S. Pat. No. 5,499,236 to Giallorenzi et al.; U.S. Pat. No. 5,410,147 to Riza et al.; and U.S. Pat. No. 5,438,440 to Paek et al.

In such prior art CDMA designs, however, there are severe drawbacks in the number of simultaneous users that the system can support. In particular, to efficiently use CDMA in optical communications, a large number of orthogonal codes must be used for providing the various coded channels. Preferably, it is desirable to have several hundreds or more such coded channels in a network. However, in optical communication a drawback of using a large number of codes is that this raises the effective noise floor in the system. In CDMA, each uniquely coded channel constitutes noise for the other channels and as the number of channels increases, this noise level increases dramatically.

Various systems have been tried to increase the number of channels. For example U.S. Pat. No. 5,499,236 proposes using synchronous transmission to reduce the noise and using pseudo noise codes that modulate the data to spread the data spectrum. However, such pseudo noise codes are not orthogonal and the spreading is in the electrical domain. Further, the requirement of synchronization requires a master station with a precise reference clock and signaling of time information back to the transmitters. U.S. Pat. No. 4,703,474 proposes combining spread spectrum techniques in the electrical domain with wavelength (frequency) division multiplexing in the optical domain. Here, pseudo-noise (PN) codes are used in the time domain and thus the system suffers the same problem as U.S. Pat. No. 5,499,236. In addition, such a system requires complex time and frequency sweeps for acquisition of signal. U.S. Pat. No. 5,438,440 suggests the use of a monochromatic light signal and a two-dimensional spatial digital encoder; i.e., a bit in the mask pattern is either fully transparent or fully opaque. Although such two dimensional spatial encoding improves the number of users the network can support relative to other prior art, it requires very complicated holographic detection systems. Using holographic detection, it is difficult to change the receive hologram so that if stations in a optical spread spectrum network are removed from the network for maintenance or other reasons, the receive code cannot be readily reassigned to a different node, lowering overall efficiency.

One proposal has been to use bipolar digital codes as described in "Optical CDMA with Spectral Encoding and Bipolar Codes" cited above. In these bipolar digital codes, bipolar Walsh or Gold codes of length N are generated for a transmitter code. For a given code U, the complement U* is also generated and the code and the complement are concatenated together as U⊕U* to form an encoding code for first state. This code is embedded in the mask along an axis with for example one state in the digital code for a cell being implemented as a transparent area and zeros represented by an opaque area in the mask. In this system, a broad band light source is dispersed with a dispersion grating, collimated with a collimating lens, passed through the mask for spatial encoding so that the axis that the light is spread is arranged along the axis of the code, focused back on a recombining grating, and then provided to the modulator. A second, almost identical encoder is also provided for encoding light from the same light source with the complementary code U*⊕U, which encoded light is also provided to the modulator. Based upon input data or some other information source, the modulator selects between the encoded spectrum from the two different sources to provide an encoded, modulated spread spectrum with U⊕U* representing a data bit "one" and U*⊕U representing a data bit "zero." One mask can be used to generate both codes (i.e., U⊕U* and U*⊕U) by stacking the two codes on the same mask pattern. Alternatively a reflecting mask may be used to generate the two codes for the modulator.

Decoding according to this technique requires transmission of the two codes (U⊕U* and U*⊕U) on different channels and then each of the codes is passed through separate matched filter for both U⊕U* and U*⊕U. The output of the matched filters for each of the codes is then supplied to optical adders and then to photodetectors in a differential arrangement.

It is believed, however, that this technique using bipolar, concatenated codes and their complements will not permit less than an optimal number of users in a real life system as the interference from each of the users is believed to be high. Further, the transmitting of the two codes in separate, recoverable channels imposes costs on the system and can also result in different path delays and transmit channel mismatch.

Therefore, it is a first object of the invention of having a spread spectrum communication system where the number of users is maximized without raising interference unduly. It is a second object of the invention to provide a system providing a relatively simple system for encoding and decoding the light but efficiently using the entire spectrum available. It is yet a third object of the invention to provide a spread spectrum communication system having codes that may be readily reassigned to other transmitters in the network.

SUMMARY OF THE INVENTION

These and other objects are obtained by using a novel spatial encoder with binary or analog encoding and a novel receiver. In particular, a wideband light source is modulated with the data or other information to be transmitted. The modulated light beam is then dispersed through for example a diffraction grating and then passed through a spatial spectrum coding mask. Preferably, the spatial coding mask present a code orthogonal to all other codes for other nodes on the network. The dispersed frequencies of the encoded modulated light beam are then recombined to provide a modulated, encoded spread spectrum optical signal for injection into an optical fiber.

Recovery of the transmitted signal is through the use of a special, matched filter. At any receiver, a beam splitter diverts part of the beam in the fiber through a diffraction grating to spatially separate the spectrum of the light in the fiber. The spatially spread signal, potentially comprising a plurality of spread spectrum optical communications, is passed through a novel receiver, thereby providing signal recovery. This receiver can be implemented in a number of ways. Three receiving structures are disclosed in this patent application depending on the proposed coding scheme.

In one embodiment, the codes are binary orthogonal codes such as Walsh codes. The spatially spread light will pass through two decoding masks. One decoding mask is the same as the encoder mask while the other decoding mask is the bit-wise complement of the encoder mask. The spatially spread decoded light signals are combined, and differentially detected.

In another embodiment, the spatially spread light can be detected by an array of detectors. Each detector in the array measures the light power of the corresponding optically spread wave length and outputs a corresponding array of electrical signals. The array of electrical signals will then be processed by a DSP. The digital processing comprises of multiplying the signal from each detector in the array by a positive or negative one depending on whether the encoder mask bit is a one (transparent) or a zero (opaque). The resulted bit products are then summed before thresholding for data recovery. This digital processing corresponds to multiplying the signal from individual detectors in the array by the corresponding bit in the Hadamard code which is the bipolar version of the Walsh encoder code.

The coding further includes the use of analog codes. Here analog coding means that the spatial encoder uses variable opacity masks as opposed to digital coding (i.e., where the spatial encoder uses masks with cells that are either transparent or opaque). The code preferably should use one of a set of unique, orthogonal wavelet functions such as cosine and/or sine waves, rectangular waves or Chebishev polynomials. The orthogonal wavelets are of course discrete functions as opposed to continuous functions due to the fact that the masks are not continuous but comprise a plurality of cells.

In this embodiment, the wavelets are quantized or discrete spatial sine waves of various harmonic frequencies. This permits decoding to be done by using a spatial fourier transform on the detected spatially spread light pattern. The limit on the number of codes is only based upon the effects of using discrete as opposed to continuous harmonic sine waves and the resolution of the receiver.

DESCRIPTION OF THE FIGURES

FIG. 6 is a graphical representation of a Fourier transform of light received from the fiber.

DETAILED DESCRIPTION OF THE PREFERRED EMBODIMENTS

Figure 1:
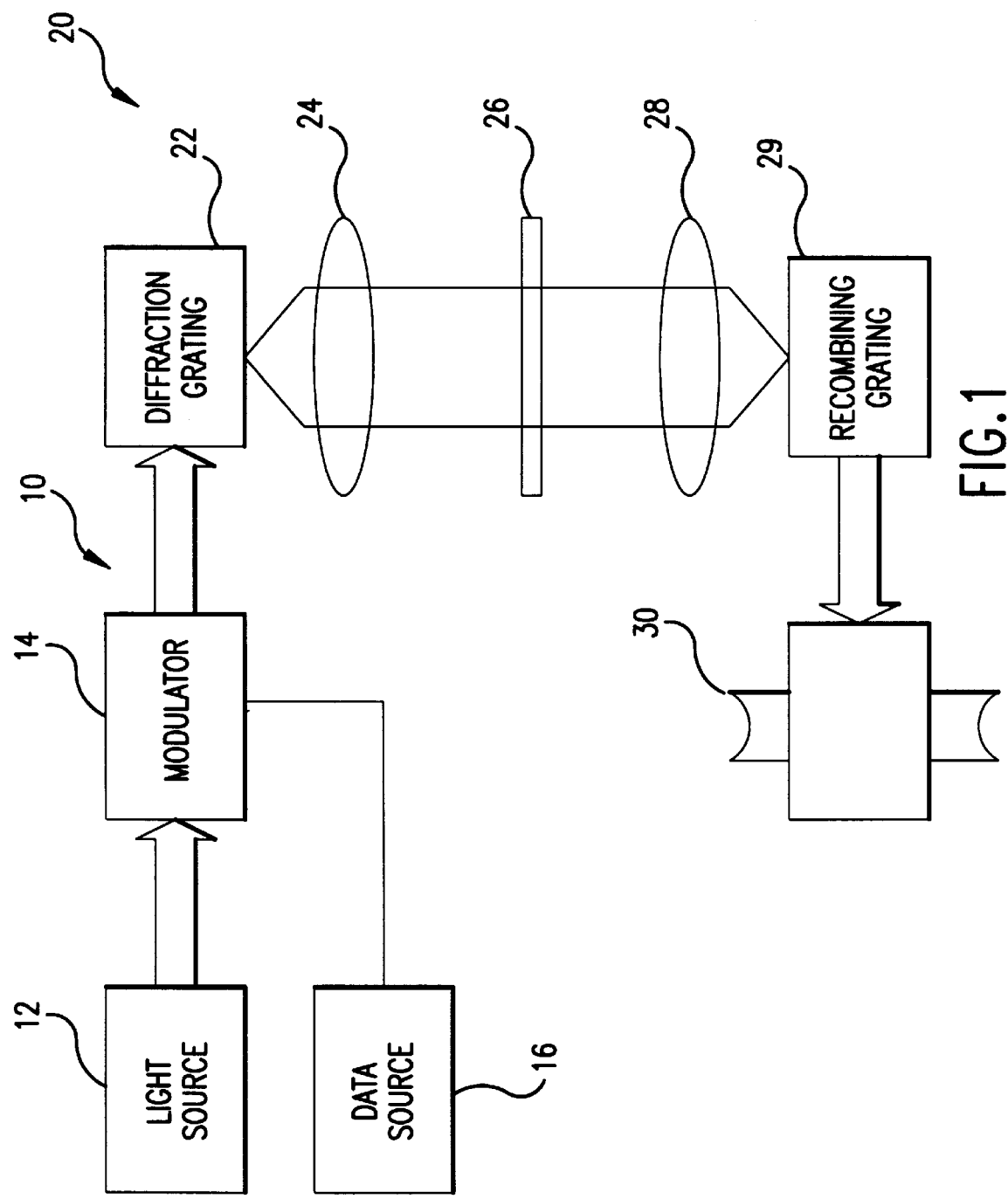
FIG. 1 is a block diagram of a first embodiment of an encoder according to the present invention.

FIG. 1 shows a first embodiment 10 of a CDMA modulator/encoder. A broadband light source 12, such as a SLD or Er-doped fiber source, is coupled to an optical modulator 14. The optical modulator modulates the light from the optical source 12 based upon data or other information from the data source 16, using, for example, keying or pulse code modulation.

The modulated broad beam light beam is then encoded by the encoder 20. The encoder 20 includes a diffraction grating 22 that spatially spreads the spectrum of the modulated light beam along an axis and then is collimated by a collimating lens 24 where the collimated beam is passed through the encoding mask 26. The encoding mask, as described below in detail, provides a spatially encoded, modulated spread spectrum beam that then is recollimated by a collimating lens 28 and combined back to a broad spectrum beam by a diffraction grating 29 for injection into the fiber 30, which may be an appropriate optical fiber.

Figure 2:
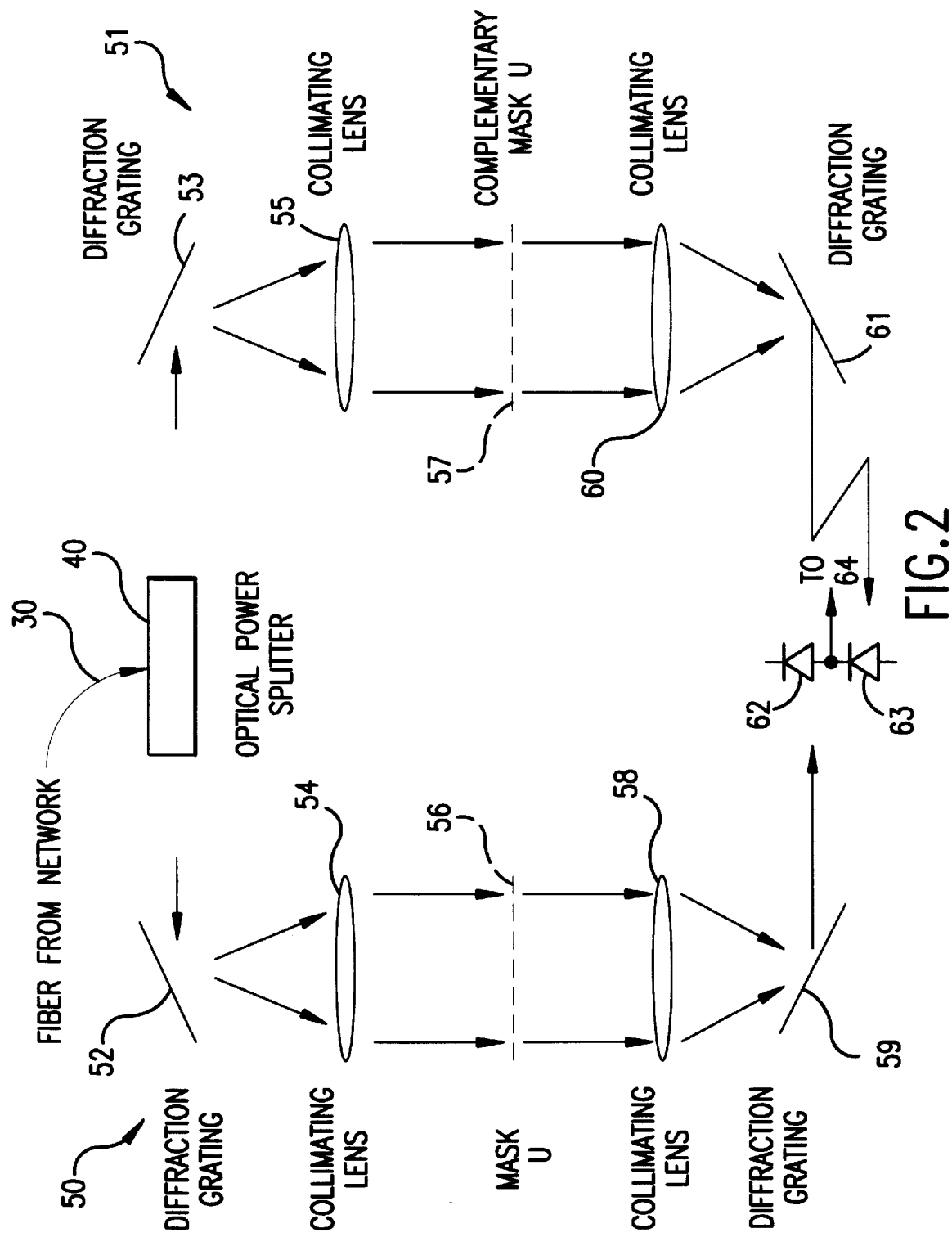
FIG. 2 is a block diagram of a first embodiment of a decoder according to the present invention.

FIG. 2 shows a compatible decoder, which has two channels 50 and 51. Through a beam splitter 40 light from the fiber 30 containing a potential plurality of spread spectrum signals, two beams are provided. One incoming beam is spread spatially along an axis by a diffraction grating 52 and is then collimated by a collimating lens 54 before being passed through a detection or decoding mask 56. The decoding mask 56 is identical to the encoding mask 26. The beam after being passed through the decoding mask 56 is passed through a collimating lens 58 and a diffraction grating 59 to remove the spatial spreading. The other incoming beam is also spread spatially by a diffraction grating 53 and is then collimated by a collimating lens 55 before being passed through a second decoding mask 57. However, this second decoding mask 57 is the bit-wise complement of the encoder mask 26. The beam, after being passed through the second decoding mask 57, is passed through the collimating lens 60 and a diffraction grating 61 to remove the spatial spreading. The output of the first decoder channel 50 may then be supplied to a photo detector 62 to convert the light into an electrical signal. Similarly, the output from decoder channel 51 is supplied to a photo detector 63 to convert the light into an electrical signal. The two electrical signals are then differenced by the back-to-back arrangement of the two detector diodes, 62 and 63 for being supplied to data and clock recovery hardware and/or software 64. The differential electrical signal is then detected for data recovery.

Figure 3:
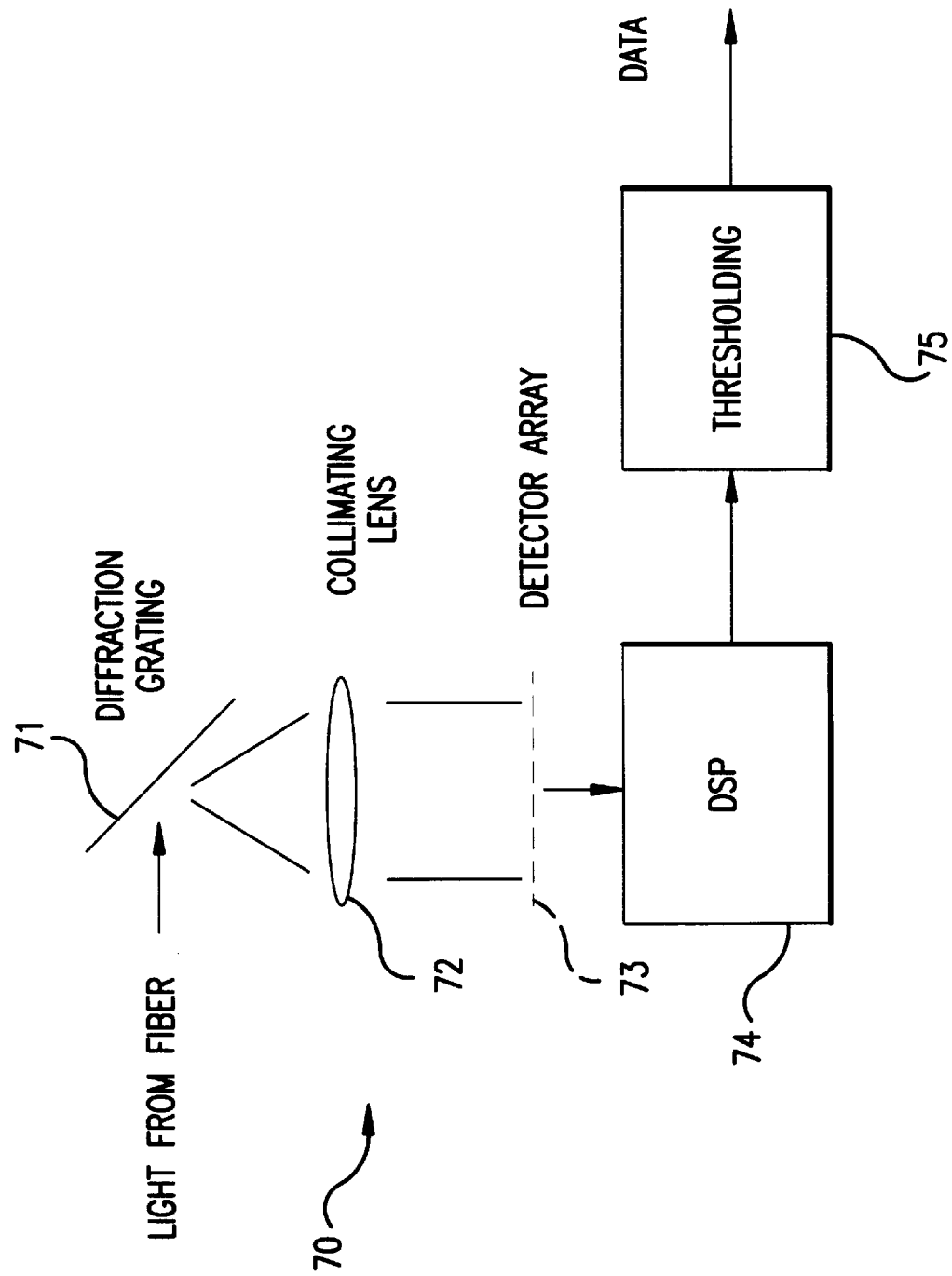
FIG. 3 is a block diagram of a second embodiment of a decoder according to the present invention.

FIG. 3 shows another embodiment of the decoder 70. In this embodiment, the beam is not split into two channels with two masks, but instead it is spread by the grating 71 and is collimated by a lens 72. The collimated light is then intercepted by an array of detectors 73. The number of detectors in the array is equal to the number of bits in the encoder mask. Each detector position corresponds to the encoder mask bit position. The detector signal from each detector in the array is multiplied by either "1" or "−1" depending on whether the corresponding encoder mask bit is a "transparent" or "opaque." The results of all the multiplier outputs are then summed. The sum is then compared with a threshold 75 for data recovery. This digital processing can be performed in discrete logic hardware or in a DSP 74 through software. It should be noted that in both embodiments of FIGS. 2 and 3 only one encoder mask is used for transmit and no concatenated code is required in contrast with prior art designs.

Figure 4:
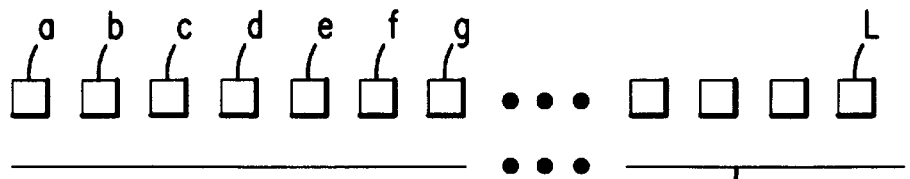
FIG. 4 is a sketch of a liquid crystal mask for use in a third embodiment of an encoder according to the present invention.

The coding masks 26, 56, 57 are preferably made of liquid crystal material as shown in FIG. 4 divided into a plurality of cells "a" through "L", with L an arbitrary integer and being the maximum permitted length of the code. The cells form a one dimensional array arranged along the axis 55 of spatial spectrum spreading caused by the diffraction gratings 22, 52. In one embodiment, the control of the cells is analog, meaning that the opacity of each cell is either infinitely adjustable or is adjustable in at least three or more separately controllable stages. Preferably a large number of finite stages, preferably sixty-four or greater levels of opacity should be used. In another embodiment, the control is binary, and Walsh code is used. These masks can be implemented by LCD pixel arrays or by a photonic integrated circuit such as a solid state amplifier array.

Figure 5A:
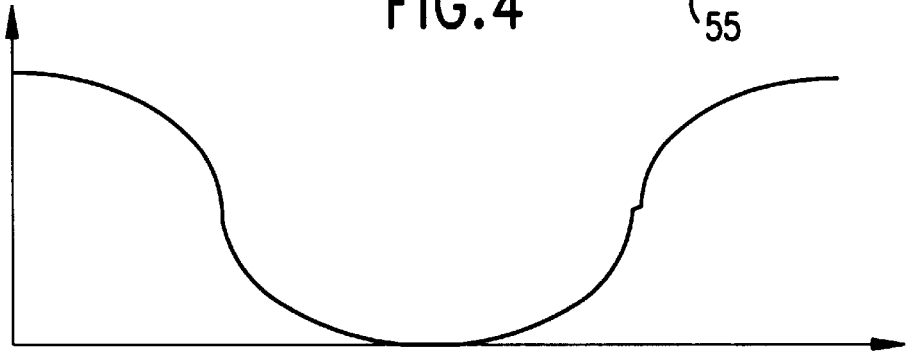
FIGS. 5A, B and C are continuous representations of discrete transparency functions for the mask of FIG. 4.
Figure 5B:
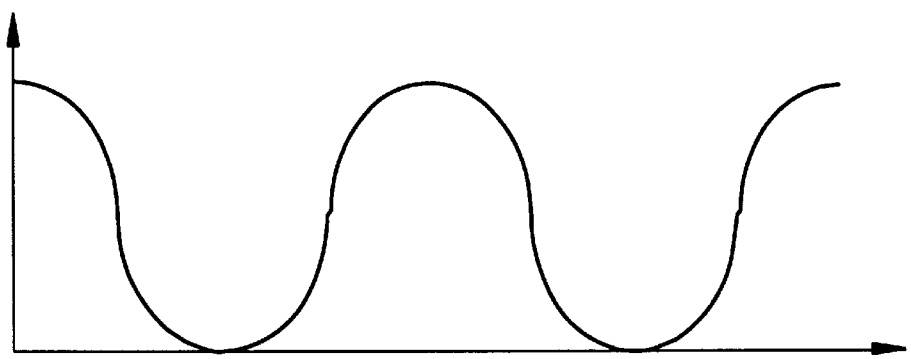
Figure 5C:
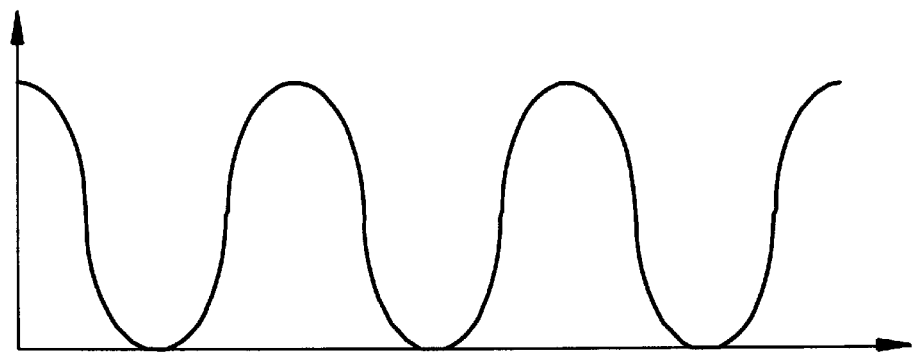

A preferred form of analog coding is using orthogonal wavelet functions. In an embodiment, the wavelet functions are discrete harmonic spatial sine waves (represented for purposes of illustration as continuous functions) as shown in FIG. 5. The ordinate axis is the axis along which the frequencies of the beam are spread and the abscissa is the relative transparency of the beam passing through a cell. In particular, a first encoder mask transparency function shown in FIG. 5A may have a spatial frequency of 1/L, where L is the number of cells. The mask of that first encoder is a discrete (as opposed to continuous) cosine wave in terms of transparency having one cycle over the frequency spectrum of L, such that the lowest and highest frequency portion of the encoded spectrum have the maximum intensity and the mid-range spectral frequencies have the lowest intensity. A second encoder mask may for example have a spatial frequency intensity mask of twice the frequency of the first encoder with two full cycles across the length of the encoder L of FIG. 5B. Still further a third encoder may have a frequency three times the frequency of the first encoder as shown in FIG. 5C. Other higher harmonics are preferably used, and preferably to maximize the system throughput, the maximum number of codes should be over one hundred and preferably over several hundred.

The maximum number of harmonics or Walsh code bits (and therefore, the maximum number of codes, is limited only by the number of cells in the mask. For the analog mask, the number of different levels of opacity permitted in the mask, results in the quantization noise in the encoder. Alternatively, rather than using cosine waves, Chebishev polynomials could also be used as they are orthogonal with respect to each other.

Using cosine waves for the encoding function also permits an easier decoder design. In particular, if one takes the spatial Fourier transform of the received signal, the received signal can be separated through a spatial filter for the frequency of the desired signal and then that signal can be recovered. As a simple example, FIG. 6, shows the Fourier transform of a signal received from a fiber where the separate encoded signals include 1/L, 2/L, 4/L and 8/L. Any one of these signals may be readily obtained by filtering for that particular spatial frequency in the frequency.

Figure 7A:
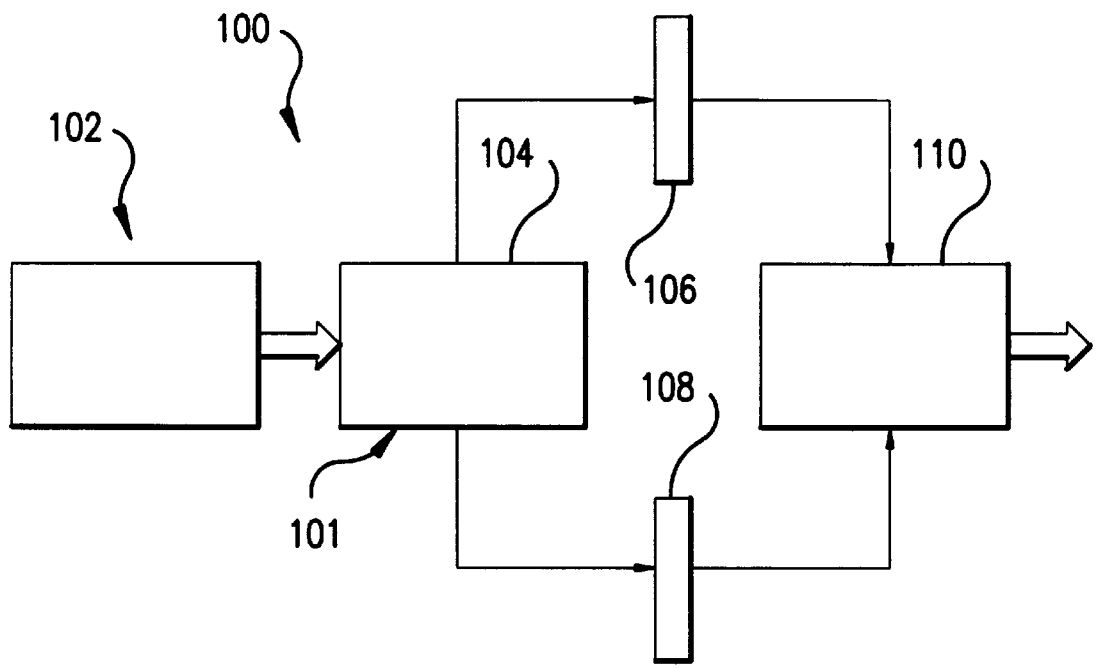
FIG. 7 is a graphical representation of an encoder and a decoder according to a third embodiment of the invention.

In a preferred third embodiment of the disclosed encoder, rather than pulse code modulate the data, an alternative method may be used for modulating signals using two codes as is shown in FIG. 7A. In this embodiment of an encoder, the optical path for the spatially spread light source 102 is switched between a first mask 106 and a second mask 108 by a switcher 104 responsive to data from a data source 101, the first mask encoding the light to provide a digital "one" signal and the second mask encoding the light to provide a digital "zero" signal for the same code channel. The modulator switches the light path between two different encoder masks using one liquid crystal in a manner that is described in the same way as the binary mask receiver embodiment. The light from both masks is then summed by a summer 110 and then provided to the optical communications channel such as a optical fiber (not shown).

Figure 7B:
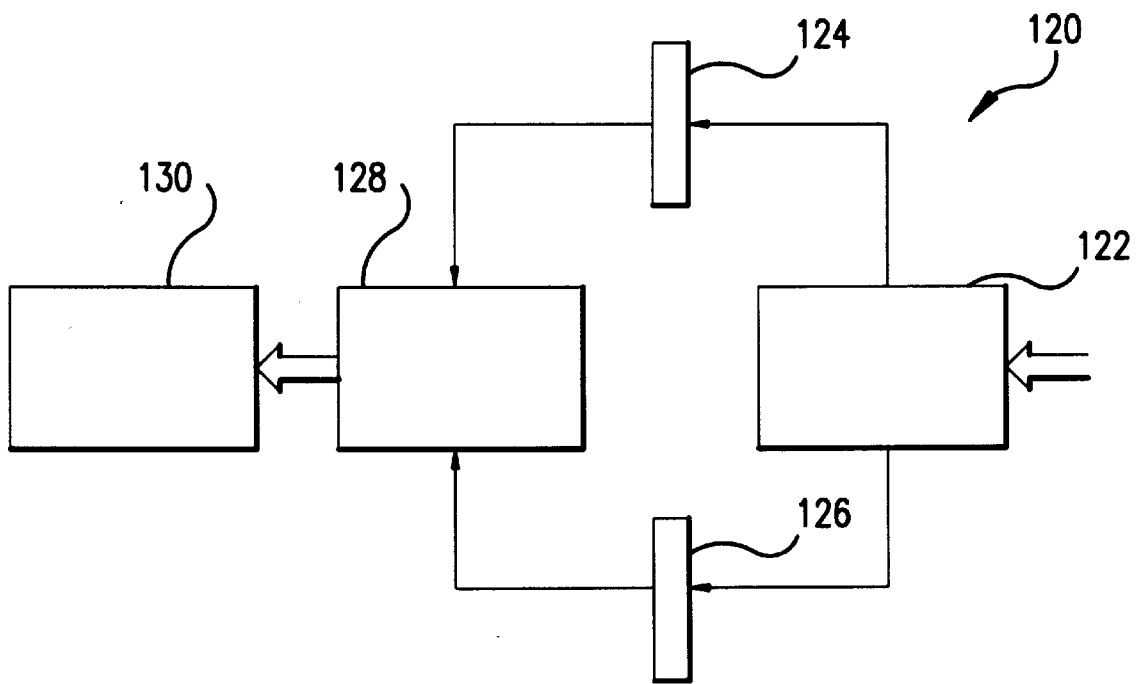

Receiving words proceeds in the converse manner as shown in FIG. 7B. A decoder 120 receives light from the communications channel and generates the spatially spread spectrum of the received light with receiving input optics 122 through masks 124, 126 which are identical to the mask 106 and the mask 108 respectively. The light from the masks 124 and 126 is then provided to a differential receiver 1 28 in the manner described above in the binary receiver embodiment. The signal from the receiver 128 may then be processed by a digital signal processor 130 for recovery of the data.

Figure 8A:
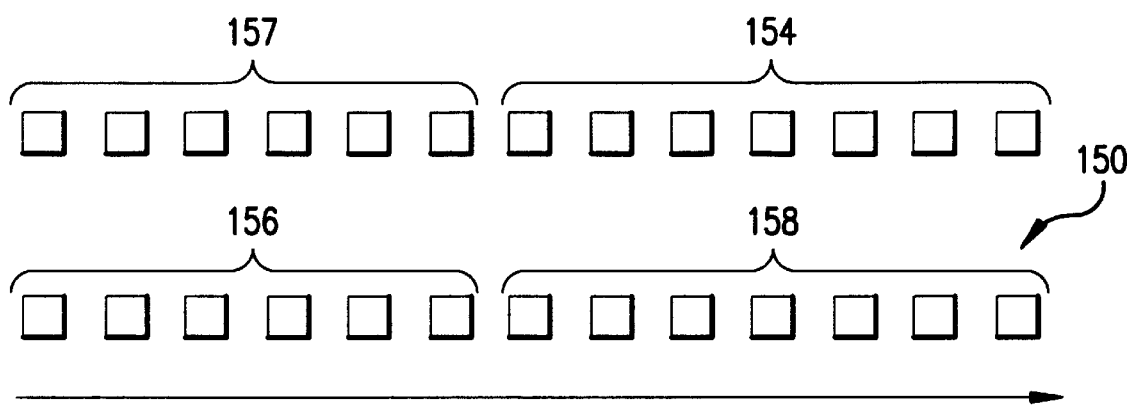
FIG. 8 is a graphical representation of a mask and mask functions according to a third embodiment of the invention.
Figure 8B:
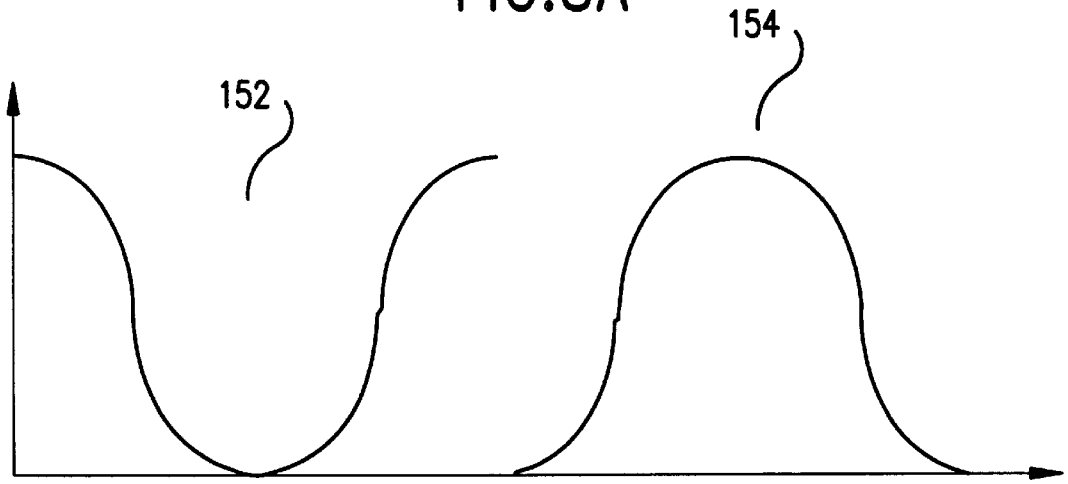
Figure 8C:
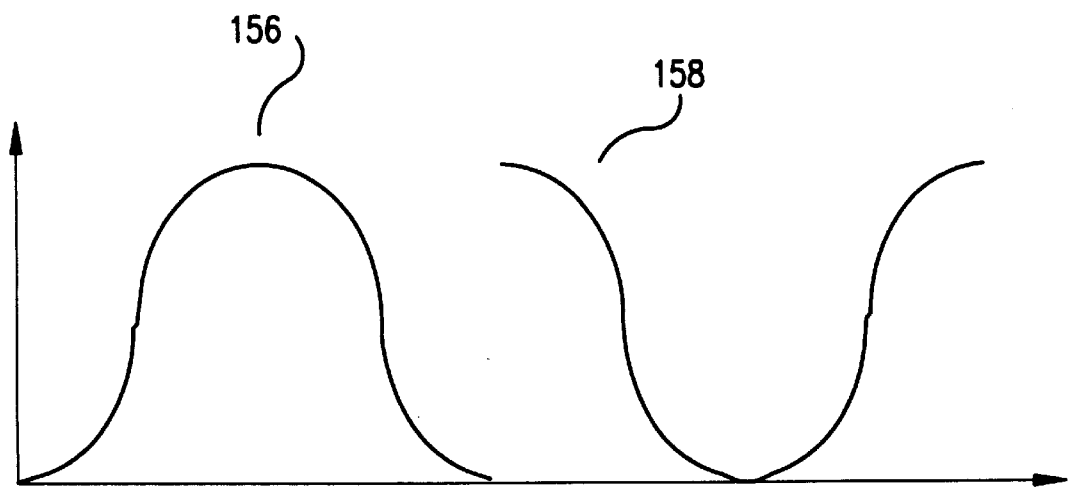

FIG. 8A shows one alternative embodiment of the masks appropriate for coding where two different masks are used for transmitting ones and zeros. In a first version, the mask formed of L cells in a liquid crystal mask 1 50 is divided into four parts, 152, 154, 156 and 158. Parts 152 and 154 comprise L/2 cells each along a first linear array arranged along the axis of spreading of the spectrum on a first row to encode a "one" for this particular code channel and at a second column, cells 156 and 158 also comprise L/2 cells arranged along the same axis for encoding a "zero" for this same channel. Preferably, the discrete transparency functions for parts 152, 154 are the complements of each other such as shown in FIG. 8B, where the ordinate represents spatial frequency and the abscissa represents intensity. For transmitting the other possibility (i.e. the zero), as shown in FIG. 8C, the complements of the discrete intensity functions for parts 156 and 1 58 are reversed. In other words, the portion of the mask in section 152 is identical to the portion of the mask in 158 and the portion of the mask in 154 is identical to the portion of the mask in 156.

In addition to having masks where the coding is complementary, it is also possible to provide coding where a first portion 152 of the mask is the orthogonal wave function and the second half is all opaque for a "zero" 154 and the second level, the first half 156 is all opaque and the second half is the same pattern as the first half 152 to make a "one." Alternatively, the first halves 152, 156 can be a first polynomial such as a sine wave and the second halves 154, 158 can be a second polynomial such as a Chebishev function.

Although specific embodiments of encoders and decoders according to embodiments of the invention are disclosed, other embodiments of the invention are also possible. For example, while discrete wavelet functions are used for encoding, it is possible to have masks that permit continuous functions for coding. For example, the masks may be formed photographically.

Furthermore, it should also be understood that all of the disclosed embodiments of encoders and decoders can also be applied to analog modulation of the optical signal.

Similarly, while only CDMA techniques have been described above, those of ordinary skill in the field will readily understand that depending upon system parameters, the system may also be used with wavelength (frequency) division multiplexing and time division multiplexing. For example, different coding schemes may be used for different portions of the optical spectrum so that wavelength division multiplexing may be used. In addition, the codes may be shared on a time sharing basis to provide for time division multiplexing Also, optical spatial (spatial) CDMA can be combined with time-domain optical CDMA to increase the number of codes and the users in the network. In the time domain spread spectrum embodiments, several users are provided with different time domain spread spectrum codes for encoding the data before the data is provided to the optical encoder. However, these users can share the same wavelength encoding schemes discussed above. Of course, at the decoder, once the received optical information is converted back into the electrical digital domain, the digital signal must be processed according to the time domain spread spectrum code to recover the desired transmitted information.

In addition to the various different possible types of combinations of multiplexing schemes that are possible, various network algorithms may also be implemented. For example, the codes for any one node may be assignable from one or more master nodes distributed throughout the network. Hence, when a node in a network comes on line, it requests a code or codes for encoding for selecting one of the possible spread spectrum channels over which to communicate. When that node leaves the network, the code that had been used by that particular node may be reassigned to a different node in the network. Various schemes may be used for making such requests such as CSMA/CD technique or token passing on a permanently assigned channel. Alternatively, token passing techniques may be used for gaining codes for securing one of the code division channels.

In addition, the disclosed embodiments permit an increase in the number of simultaneous users. In particular, in prior art schemes such as those discussed above, the maximum number of simultaneous users that are permitted for the same number of codes is $2^{N/2}$ where N is the maximum number of codes However, in the disclosed embodiment, the maximum number of codes with holding everything else constant is $2^N$. Thus, total system throughput is dramatically increased, thereby permitting a system throughput of at least one half of a terabit, with the total system throughput being determined by the maximum number of simultaneous users, and the users data rate.

Therefore, while several specific embodiments of the invention have been disclosed, it will be understood by those of skill in the field that many alternative embodiments are possible. Of course, the scope of the inventions disclosed should be measured by the claims.

I claim:

1. A method of recovering data a spatially encoded light signal, the light signal spatially encoded according to a first binary code of length L, the light signal transmitted over and recovered from an optical fiber having a plurality of such spatially encoded light signals, the method comprising;

diverting light from the optical fiber and separating the light into first and second portions;

spatially spreading the spectrum of the first and second light portions;

passing the first light portion through a first mask having L cells defining the first binary code of length L to provide a first filtered spectrum;

passing the second light portion through a second mask having L cells and defining a bit-wise complement to the first binary code of length L to provide a second filtered spectrum; and providing the first filtered spectrum and the second filtered spectrum to a differential detector and differentially detecting signals including the data.

2. The method of claim 1, wherein the encoded light signal is modulated to have first ad second states, the method further comprising:

determining if the encoded light signal is in the first state or the second state based upon detecting the light from both the first and second filtered spectra.

3. A method of communicating between a plurality of nodes on an optical spread spectrum communications network, the method comprising:

modulating light with information at a data rate;

encoding the light with an optical spread spectrum encoder the encoder providing spread spectrum light and modulating the spread spectrum light with a first spatial modulation pattern corresponding to a binary code of length L chosen from a set of Walsh codes of length L, the encoder outputting modulated encoded light;

transmitting the modulated encoded light on an optical communication channel; and decoding the modulated encoded light by providing first and second portions of the received modulated light, spreading the first and second portions to first and second spatial modulation patterns.

4. A method for spread spectrum optical communications, the method comprising:

receiving a light signal from an optical communication system having a plurality of spatially encoded light signals, the light signal spatially encoded according to a first binary code of length L the light signal transmitted over and recovered from the optical communication system;

dividing the light signal into first and second light components;

passing the first light component through a first mask having L cells and passing the second light component through a second mask, the first mask modulating the first light component with a binary code of length L defined by the L cells of the first mask, the second mask providing a spatial modulation function that is the bit-wise complement of the binary code of the first mask; and detecting first and second output light signals passing through the first and second masks, respectively, wherein the detecting is accomplished by measuring a difference between the first and second signals.

5. The method of claim 4, wherein after dividing the light into first and second light components, a spectrum of the first and second light components is spatially spread before passing the first and second light components through the first and second masks.

6. The method of claim 5, wherein the first and second output light signals are spatially compressed before detecting.

7. The method of claim 4, wherein the binary code of the first mask embodies a Walsh code.

8. The method of claim 7, wherein the second mask provides a function which is the bit-wise complement of the function of the first mask.

9. The method of claim 8, wherein detecting is performed using a differential detector.

10. The method of claim 9, wherein the differential detector comprises back-to-back diodes.

11. A method for spread spectrum optical communications, the method comprising:

modulating a first light source with data;

spatially spreading a spectrum of the first light source along a first axis;

selectively attenuating portions of the spectrum by passing the spread spectrum of the light source through a first encoding mask to spatially encode the spectrum, wherein the first encoding mask is a binary mask having L cells, each representative of a bit of a Walsh code having a length L and wherein the spatially spread spectrum of the first light source spans the L cells of the first encoding mask;

combining the spatially encoded spectrum for optically transmitting the data to form a first modulated optical data signal;

injecting the first modulated optical data signal into an optical fiber;

receiving light comprising the optically transmitted data;

dividing the received light into first and second light components;

spectrally spreading the first light component and spectrally spreading the second light component;

passing the first light component through a first decoding mask and passing the second light component through a second decoding mask, the first decoding mask having a spatial pattern identical to the spatial pattern representing the Walsh code of the first encoding mask; the second mask representing a complementary function to the Walsh code of the first mask;

spectrally combining the first light component and spectrally combining the second light component after the first and second light components pass through the first and second decoding masks; and detecting the optically transmitted data from the spectrally combined first and second light components, respectively, wherein the detecting is accomplished by a difference measurement that provides an electrical output signal representative of the optically transmitted data.

12. The method of claim 11, wherein the detecting comprises providing the spectrally combined first and second light components to first and second optical detectors, respectively.

13. The method of claim 12, wherein the difference measurement is performed on electrical signals.

14. The method of claim 11, wherein the detecting comprises providing the spectrally combined first and second light components to first and second photo diodes connected in a back-to-back configuration..

* * * * *

UNITED STATES PATENT AND TRADEMARK OFFICE
CERTIFICATE OF CORRECTION

PATENT NO. : 5,867,290
DATED : February 2, 1999
INVENTOR(S) : Dutt, et al.

It is certified that error appears in the above-identified patent and that said Letters Patent is hereby corrected as shown below:

At col. 3, line 32, change "present" to --presents--;
At col. 6, line 31, change "frequency" (first occurrence) to
    --received signal--;
At col. 7, line 9, change "1 58" to --158--;
At col. 8, line 9, after "codes" insert a period --.--;
At col. 8, line 42 (claim 2), change "ad" to --and--;
At col. 8, line 52 (claim 3), after "encoder" (first occurrence)
    insert a comma --,--;
At col. 9, line 4 (claim 4), after "L" insert a comma --,--; and
At col. 9, line 10 (claim 4), after "cells" insert a comma --,--.

Signed and Sealed this

Thirteenth Day of July, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. :    5,867,290

DATED       :   February 2, 1999

INVENTOR(s) :   Birendra DUTT; Manouher NARAGHI, and James K. CHAN

It is certified that error appears in the above-identified patent and that said Letters Patent is hereby corrected as shown below:

Column 1, line 3,    please add the following statement:

- -This invention was made with Government support under Contract F30602-98-C-0183 awarded by the Air Force. The Government has certain rights in this invention. - -

Signed and Sealed this

Fifth Day of December, 2000

Attest:

Q. TODD DICKINSON

*Attesting Officer*           *Director of Patents and Trademarks*